No. 763,558. Patented June 28, 1904.

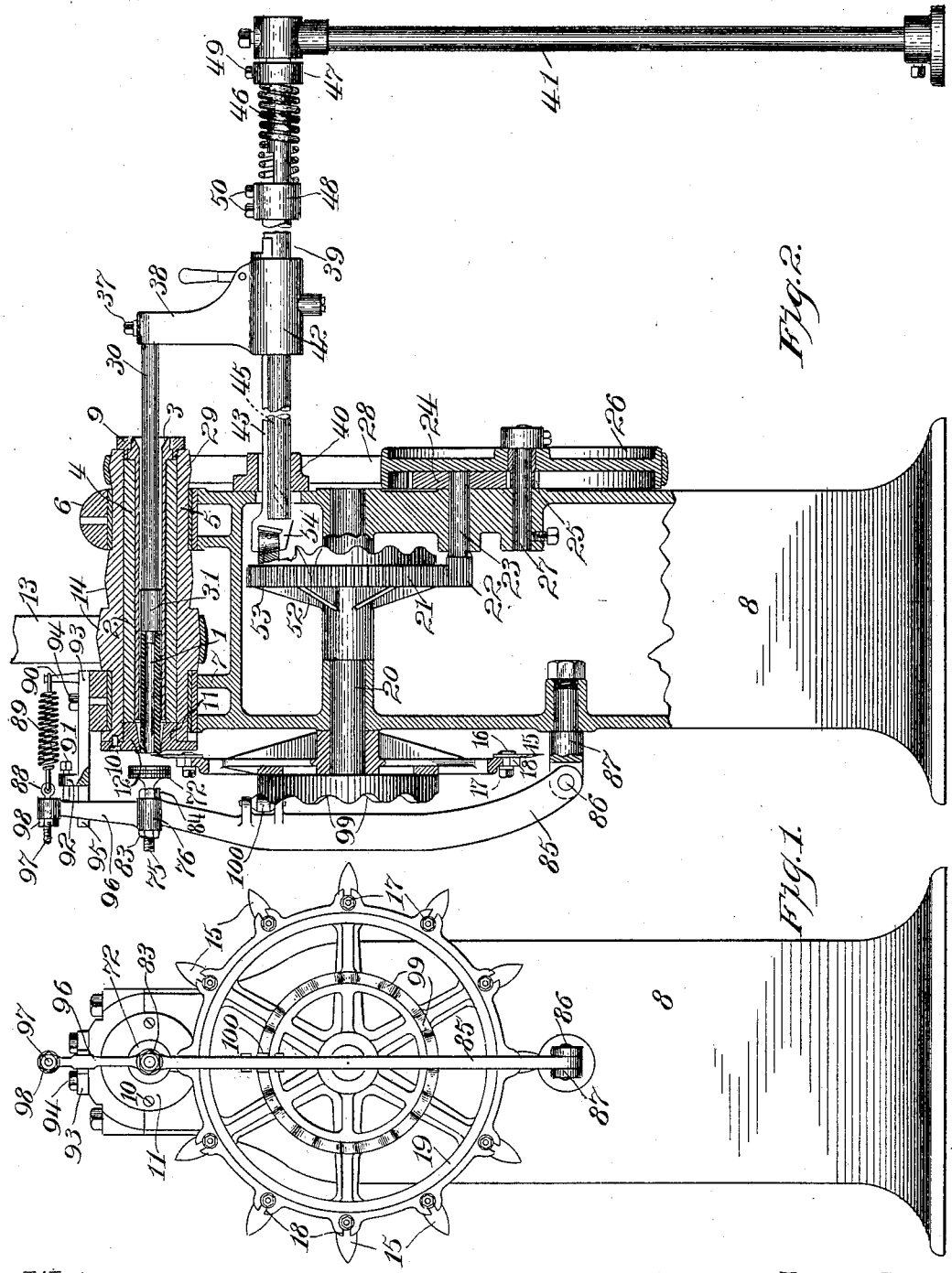

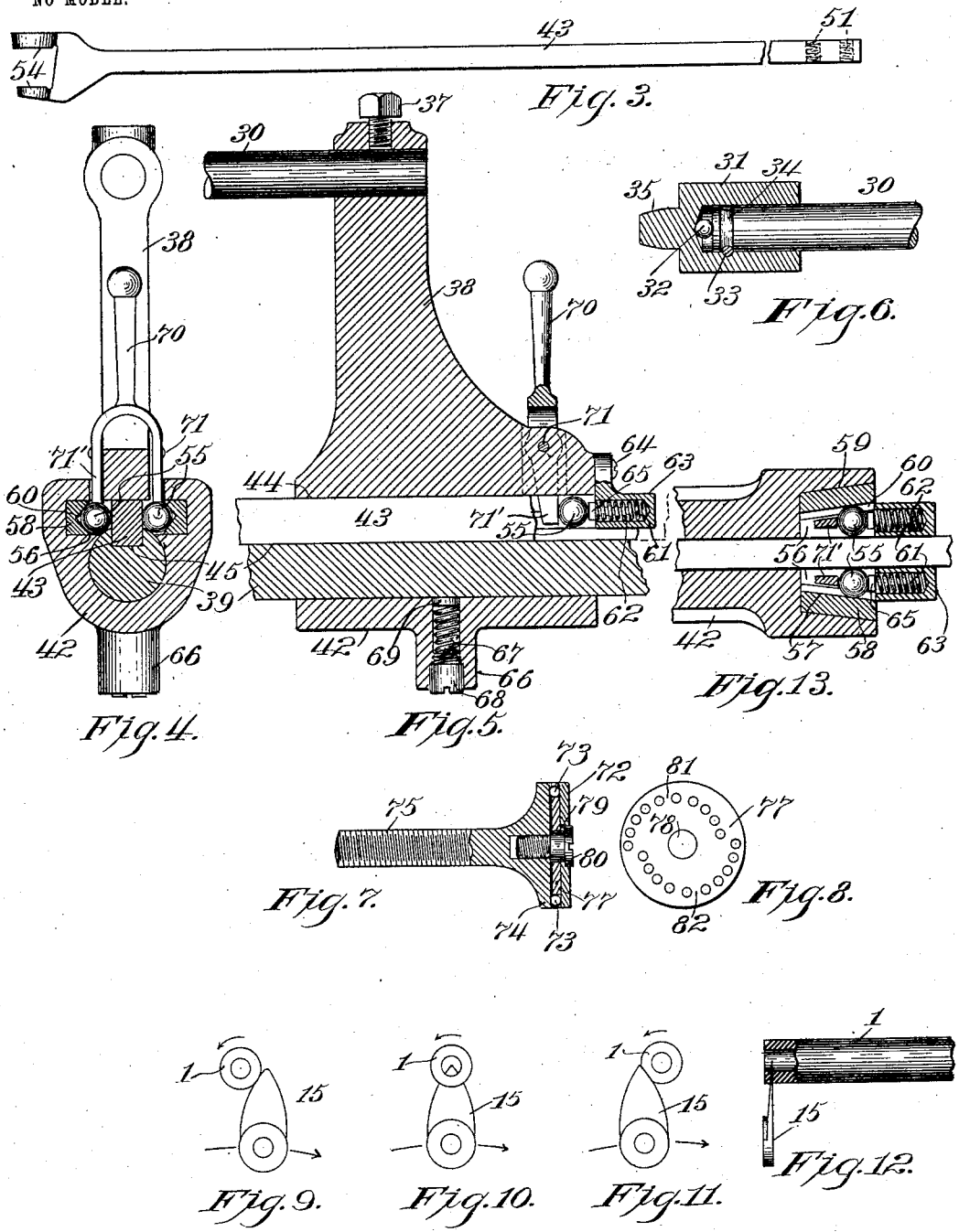

UNITED STATES PATENT OFFICE.

FRANK E. HARTHAN, OF TRENTON, NEW JERSEY, ASSIGNOR TO LOUIS C. TAYLOR, TRUSTEE, OF TRENTON, NEW JERSEY.

RUBBER-GASKET-MAKING MACHINE.

SPECIFICATION forming part of Letters Patent No. 763,558, dated June 28, 1904.

Application filed August 13, 1903. Serial No. 169,380. (No model.)

*To all whom it may concern:*

Be it known that I, FRANK E. HARTHAN, a citizen of the United States, residing in Trenton, in the county of Mercer and State of New Jersey, have invented certain new and useful Improvements in Rubber-Gasket-Making Machines, of which the following is a specification.

This invention relates to means for producing gaskets or disks of rubber or similar material by cutting or slicing them from the end of a tube or bar; and its object is to enable gaskets or the like to be produced economically and rapidly.

In the drawings forming part of this specification, Figure 1 is an end elevation, and Fig. 2 is a side elevation, partly in section, of one form of machine made in accordance with my present improvements. Fig. 3 is a view of a feeding-bar used in advancing the tube, bar, or stock between slicing operations. Fig. 4 is a sectional end elevation, and Fig. 5 a sectional side elevation, of mechanism for feeding the stock. Fig. 6 is a detail of the effective end of a follower-rod. Fig. 7 is a side view, and Fig. 8 an end view, of an adjustable stop for the end of the stock. Figs. 9, 10, and 11 illustrate the operation of the cutters or slicers, arrows indicating the direction of rotation of the stock and also of the slicer or slicers. Fig. 12 is an edge view of a slicer and stock seen at Fig. 11, the tube being shown partly in section.

In the several views like parts are identified by like signs.

The stock from which the gaskets are to be cut is shown in section at 1, Fig. 2, the stock being inserted within a tubular metallic guide 2, having a flaring rear end 3 for convenience in inserting the stock. Said tubular guide forms a lining within a long bushing 4, which extends centrally through a hollow spindle 5, the latter being mounted in pillow-blocks 6 and 7, rising from the top of a box-like frame 8. The bushing 4, together with the tubular guide 2, is detachably secured by a screw 9 within the spindle, so that when desired said tube and bushing may be removed and other tubular guides adapted to fit other sizes of rubber stock may be inserted together with appropriate bushings, so that the machine is adapted for slicing gaskets of different diameters. Upon the front end of the spindle is detachably secured by screws 10 a bush 11, having a tapering constricted central opening 12, which is adapted to grip or pinch the rubber stock, so as to cause the latter to rotate with the spindle. The latter is driven by a belt 13, a cone-pulley 14 being provided to give different speeds. The head-bushing 11 may be removed and bushing having stock-grippers 12 of other diameters may be substituted as required. The bushing 4 may be omitted in some cases and the guide 2 rigidly supported upon the screw 9.

Short spear-like cutters or slicing-knives 15 are detachably mounted by bolts 16 and nuts 17 in open radial slots 18, formed in the periphery of a wheel 19, said knives projecting radially from the rim of the wheel, as at Fig. 1. The slicers may be otherwise formed and mounted. In order to rotate said wheel, with its set of slicers, at low speed while the spindle is rotating at high speed, I mount said wheel 19 upon a shaft 20, upon which is rigidly mounted within the frame 8 a spur-gear 21, which is in mesh with a small pinion 22, mounted upon a shaft 23, journaled in one wall of the frame and carrying without said frame a spur-gear 24, the latter meshing with a pinion 25, which is rigid with a pulley 26, mounted upon a stud 27 and connected by a belt 28 with a pulley 29, mounted upon said hollow spindle. Thus the pulley 26 is frictionally driven at slower speed than said spindle, since the pinion 25 is driven at slower speed than the pulley 26, the pinion 22 at slower speed than the pinion 25, and the shaft 20 and wheel 19 at slower speed than the pinion 22, and in consequence the knives pass slowly by the end of the hollow spindle 5 in the direction indicated by the arrows at Figs. 9, 10, and 11, while said spindle is rotating rapidly, as also indicated by arrows.

For feeding the rubber tube through the spindle between slicing operations I provide a follower-rod 30 in line with the spindle 5 and carrying a follower 31, which is revolubly mounted upon the leading end of the rod 30 and is adapted to pass within the hollow tube-carrying spindle 5, so as to feed the rubber tube through the same. Said follower 31 turns upon the end of the rod 30 and is provided with a transverse locking-pin 33, which enters an annular groove 34, Fig. 6, formed upon said rod 30, said follower being provided with a nipple 35 for insertion into the tail end of the tubular stock. The rear end of the said rod 30 is secured by a screw 37 within the upper end of a head 38, which is slidable along a horizontal rail or bar 39, the latter being secured at one end in a boss 40, projecting from the side of the frame 8, and at the other end being supported upon a stand 41. Said head 38 is provided with a base 42, bored to fit upon said bar, the latter being preferably circular in cross-section, as seen at Fig. 4.

A feeding-rod 43 passes through a groove 44, formed in said base 42, and rests in a longitudinal groove 45, formed in the rail 39, so that when the rail is circular in cross-section the rod 43 may incidentally serve to spline the head 38 upon the bar. By means of a spring 46, coiled about the outer end of the rail 39 and working between collars 47 and 48, said feeding-rod 43 is pressed constantly in a direction to advance the head 38, together with its follower-rod 30 and the tubular stock 1. It will be observed that the collar 47 is adjustably secured by a screw 49 upon the rail 39, so as to enable adjustment of the tension of the spring, while the collar 48 is rigidly secured by screws 50 to the feeding-rod 43, said screws entering tapped perforations 51, Fig. 3, in the outer end of said rod. Said feeding-rod is positively retracted at intervals by means of face-cams 52, which are formed or provided upon the face of gear 21, and hence are rigid with the cutter or slicer-wheel 19. Said cams correspond in number with the cutters or slicers, so that the feeding-rod is retracted once for each slicing operation, and said rod is provided upon its inner end with a conical roll 53, adapted to engage said cams 52, the rod being forked at 54 to receive said roll.

The operative connection between the feeding-rod and the follower-head 38 preferably comprises a pair of balls or rollers 55, which lie opposite each other and in contact with the sides of the feeding-rod and work in recesses 56, formed in the base 42, said recesses having converging sides 57. If desired, said sides may be formed by inserting bearing-blocks 58 in a recess 59 in said base, and said bearing-blocks may be V-grooved to receive the balls, as at 60. By means of compression-springs 61 said balls or rollers are constantly pressed toward the small ends of the recesses, and hence constantly wedge against the sides of the feeding-rod, so that the latter when advanced by the compression-spring 46, Fig. 2, is enabled to clutch the follower-head and force the same also to advance and drive the stock through the spindle. Said springs 61 are inserted in seats 62, formed in a bracket 63, secured by screws 64 to the base 38 of the follower, and surround plungers whose heads 65 bear directly against the balls or rollers to maintain the wedging action thereof. When the feeding-rod is moved to the right by any cam 52, it tends to move the rollers toward the larger ends of the recesses, and hence the wedging action is relieved and the follower-head 38 is not stirred. Said head is preferably provided with a brake or friction device mounted in a boss 66 upon its under side and comprising a compression-spring 67, a screw 68 for regulating its tension, and a plunger having a head 69 for bearing up against the under side of the rail, so that the head is not liable to accidental displacement along the rail. As the feeding-rod reciprocates back and forth between the cams 52 and the spring 46 it advances the follower-head when moved by said spring; but said head remains stationary when the feeding-rod is retracted by said cams, so that the head gradually advances until the stock is consumed.

When it is desired to withdraw the follower, it is necessary only to pull back a lever 70, which is pivoted at 71 upon the follower-head and is provided at its lower end with prongs 71', which enter the recesses 56 in position to press the rollers 55 toward the larger ends of the recesses, thereby releasing the follower-head from the control of the feeding-rod, so that the head may be readily slipped the entire length of the rail 39.

Adjoining the tube-gripping end of the spindle 5 I mount a stop 72 for gaging the thickness of the gaskets and supporting the leading end of the rubber tube during the slicing operation. Said stop, against which the end of the stock rests during the slicing operation, is preferably revoluble and is provided with antifriction-rollers 73, which run between said rest and a supporting-plate 74, the latter being provided with a stem 75, which extends horizontally through a boss 76. The balls 73 are carried in perforations in a spacer-plate 77, the latter also having a central perforation 78, whereby it is mounted upon the shoulder 79 of a screw 80 together with said rest 72. The spacer serves to support the balls as they roll between the face-rest and the bearing-plate 74, and preferably the balls are disposed in two arcs 81 and 82, which are eccentric to each other and also eccentric to the central bearing 78, so that the balls are disposed at different distances from the center of rotation of the face-rest, and hence run freely in different concentric paths, whereby rapid wearing of the grooves in either the support 74 or the face-rest 72 is avoided.

The boss 76 lies opposite the mouth or contracted part 12 of the hollow spindle, and the face-rest is adjustable in said boss, the stem 75 being threaded therethrough and nuts 83 and 84 being provided for securing the face-rest at different positions relatively to the set of slicers 15, so as to enable the production of gaskets of any desired thickness within certain limits. Said boss is formed upon an arm 85, which at its lower end is pivoted at 86 to a stud 87, projecting from the framework 8, and at its upper end or above said boss 76 the arm is provided with an eye 88, in which is caught a draw-spring 89, whose other end is caught upon a stud 90. By means of said spring the arm 85 is pressed against an adjustable stop 91, which is threaded through an ear 92, formed upon a bracket 93, secured by bolts 94 to the top of the pillow-block 7, said bracket being provided with a slotted outer end 95 to receive and guide the portion 96 of the arm 85 which extends above the stop 72. The eye 88 is formed with a stem 97, which is threaded through the top of the arm and provided with a nut 98 for adjusting the tension of the spring 89. Said arm 85 is pivoted for the purpose of enabling the face-rest 72 to be retracted after each gasket is sliced off, and for retracting the arm I provide upon the wheel 19 a succession of face-cams 99, with which engages a roller 100, mounted upon said arm 85 below the face-rest.

In operation a tubular guide 2 of the proper diameter is placed within the spindle 5, together with a corresponding bushing 4, both being secured by the screw 9. A bushing 11, having a tapering perforation 12 of corresponding diameter and suitable for gripping the rubber tube, is attached to the opposite end of the spindle. The stock 1 is then inserted in the mouth 3 of the guide 2, and pushed through the spindle and the contracted mouth 12 until it contacts with the face-rest 72. The releasing-lever 70 is then operated to free the follower-head, so that it may be slid along the rail 39 until the nipple 36 upon the follower-rod 30 can be inserted within the end of the rubber tube, which may be of sufficient length to project considerably from the rear end of the hollow spindle, whereupon the machine is started. The belt 13 rotates the spindle 5 and the rubber stock, while through the described gearing the slicer-wheel 19 is rotated at slow speed, so that the slicers move slowly past the spindle, as indicated at Figs. 2, 9, 10, and 11, severing a gasket from the end of the tube. At this moment the roller 100 upon the arm 85 rides upon one of the cams 99 and retracts the stop, thus permitting the gasket to drop into any convenient receptacle. During the described operation the set of cams 52 is in rotation, and when the slicer has passed the end of the stock the feeding-spring 46 is enabled to advance the feeding-rod 43, which, by means of the clutching-roller 55, carries along the follower-head 38, together with the follower-rod 30 and the stock. The sets of cams 52 and 99 are so timed that said stock is advanced before the arm 85 and the stop 72 are returned to normal position by the spring 89, and the throw of the feeding-rod 43 is preferably excessive, as otherwise, owing to the yielding nature of the stock, the leading end thereof might in some cases fail to reach the proper position for slicing a gasket of the required thickness. In case the leading end of the stock should project too far from the mouth 12 it is forced back to the proper position by the action of the spring 89, which in each case brings the upper portion 96 of the face-rest arm 85 against the stop 91, said spring 89 being able to overcome the friction of the brake 69 and force the stock and the head 38 back during each retraction of the rod 43 as far as may be necessary, according to the thickness of the gasket to be cut. By adjusting the screw 91 the stroke of the arm 85 may be varied, and, as already explained, by adjusting the stem 75 the rest of the gage 72 may be set to cut gaskets of different thicknesses.

Variations may be resorted to within the scope of my invention, and portions of my improvements may be used without others.

Having thus described my invention, I claim—

1. The combination with a hollow spindle and rotating means therefor, said spindle being provided with means for gripping a tube or bar of rubber or any similar stock, of a revoluble stop opposite said spindle, a slicer mounted to pass between said rest and said spindle, and means for feeding the rubber tube intermittently through the spindle.

2. The combination with a hollow spindle and rotating means therefor, said spindle being formed at one end with a contracted mouth for gripping a yielding tube or bar, of a set of slicers, means for rotating said slicers slowly past said mouth, and intermittently-operating means connected to said slicer-rotating means for feeding said tube through said spindle after each slicer passes the same.

3. The combination with a device formed for gripping a tube or bar of soft stock and means for rotating said gripping device, of a set of slicers mounted for rotation past said gripping device, means for rotating said set of slicers, and means for feeding said stock between slicing operations.

4. The combination with a device formed for gripping a tube or bar of flexible stock, and means for rotating said gripping device, of a set of slicers, means for rotating said set of slicers past said gripping device, feeding means including a follower adapted to engage the tail end of the stock, or bar, and a stop engageable by the leading end of the stock.

5. In a machine of the class specified, means for supporting and rotating a tube or bar of flexible stock, means for feeding said stock intermittently, a succession of means for slicing off the end of the tube to form gaskets or disks, and means for predetermining the thickness of the gaskets or disks, substantially as set forth.

6. The combination with a set of slicers and rotating means therefor, of revoluble means for supporting a tube or bar of soft stock in position to be operated upon by said slicers, a revoluble follower for said stock, means for advancing said follower intermittently, and a stop for the leading end of the stock.

7. The combination with a set of slicers and rotating means therefor, of means for supporting a tube or bar of flexible stock in position to be operated upon by said slicers, means for advancing said stock intermittently, and a revoluble stop for the leading end of the stock.

8. The combination with a set of slicers and rotating means therefor, of revoluble means for supporting a tube or bar of soft stock in position to be operated upon by said slicers, a revoluble follower for said stock, means for advancing said follower intermittently, and a revoluble stop for the leading end of the stock.

9. The combination with a set of slicers and rotating means therefor, of a hollow spindle, rotating means for said spindle, means upon said spindle for gripping a tube or bar of soft stock, a revoluble follower for the stock, said follower being adapted to enter said spindle, means for advancing said follower intermittently, and a stop for the leading end of the stock.

10. The combination with a set of slicers and rotating means therefor, of a hollow spindle, rotating means for said spindle, means upon said spindle for gripping a tube or bar of flexible stock, a revoluble follower for the stock, said follower being adapted to enter said spindle, means for advancing said follower intermittently, and a revoluble stop for the leading end of the stock.

11. The combination with a hollow spindle and rotating means therefor, said spindle being provided with means for gripping a tube or bar of flexible stock, of a revoluble stop opposite said spindle, a slicer mounted to pass between said rest and said spindle, means for effecting fine relative adjustments between said rest and said slicer for varying the thickness of the gaskets or disks sliced from the tube, and means for feeding the stock intermittently through the spindle.

12. The combination with a device formed for gripping a tube or bar of flexible stock, and means for rotating said gripping device, of a succession of slicers mounted for movement past said gripping device, means for operating said slicers, means for feeding said stock between slicing operations, a stop for the stock, and means for retracting and then returning said stop after each slicing operation.

13. The combination with a device formed for gripping a tube or bar of flexible stock, and means for rotating said gripping device, of a slicer, means for operating said slicer past said gripping device, yielding feeding means including a spring and a follower adapted to engage the tail end of the stock, and a stop engageable by the leading end of the stock.

14. The combination with a succession of slicers and rotating means therefor, of revoluble means for supporting a tube or bar of flexible stock in position to be operated upon by said succession of slicers, one at a time, a revoluble follower for said stock, means for advancing said follower intermittently, a revoluble stop for the leading end of the stock, and means for retracting and then returning said stop after each slicing operation.

15. The combination with a slicer and operating means therefor, of means for supporting a tube or bar of flexible stock in position to be operated upon by said slicer, means, including a stock-pressing spring, for advancing said stock intermittently, and a revoluble stop engaged by the leading end of the stock; said stop being mounted for adjustment for varying the thickness of the gaskets or disks sliced from the stock.

16. The combination with a slicer and operating means therefor, of revoluble means for supporting a tube or bar of flexible stock in position to be operated upon by said slicer, a revoluble follower for said stock, a spring for pressing said follower forward, a revoluble stop for the leading end of the stock, means for retracting said stop after each slicing operation, and a spring for returning said rest to normal position.

17. The combination with a slicer and operating means therefor, of a hollow spindle, rotating means for said spindle, means upon said spindle for gripping a tube or bar of soft stock, a revoluble follower for the stock, said follower being adapted to enter said spindle, a yielding means for advancing said follower intermittently, a stop for the leading end of the stock, and means for retracting and returning said stop.

18. The combination with a slicer and operating means therefor, of a hollow spindle, rotating means for said spindle, means upon said spindle for gripping a tube or bar of soft stock, a revoluble follower for the stock, yielding means for advancing said follower intermittently, a revoluble stop for the leading end of the rubber stock, and means for effecting adjustments of the stop so as to vary the thickness of the gaskets or disks sliced from the stock.

19. The combination of a spindle provided with means for gripping a tube or bar of soft stock, a wheel, a series of slicers mounted upon said wheel, speed-reducing gearing connecting said spindle to said wheel, and means connected to said wheel for effecting intermittent feeding movements of the stock.

20. The combination of a spindle provided with means for gripping a tube or bar of soft stock, a wheel, a series of slicers mounted upon said wheel, speed-reducing gearing connecting said spindle to said wheel, means connected to said wheel for effecting intermittent feeding movements of the stock, a stop opposite said spindle, and means operatively connected to said wheel for retracting said stop.

21. The combination of a spindle provided with means for gripping a tube or bar of flexible stock, a wheel having mounted thereon a series of slicers, speed-reducing gearing connecting said spindle to said wheel, means connected to said wheel for effecting intermittent feeding movement of the stock, a vibratory arm, a stop opposite said spindle and connected to said arm, and a succession of cams, one for each slicer, so mounted upon said wheel as to vibrate said arm between slicing operations.

22. The combination of a spindle provided with means for gripping a tube or bar of flexible stock, a wheel having mounted thereon a series of slicers, speed-reducing gearing connecting said spindle to said wheel, means connected to said wheel for effecting intermittent feeding movement of the stock, a vibratory arm, a stop adjustably mounted upon said arm opposite said spindle, an adjustable stop for said arm, a spring for holding said arm against said adjustable stop, and a succession of cams mounted upon said wheel for vibrating said arm between slicing operations.

23. The combination with a succession of slicers and operating means therefor, of a spindle provided with means for gripping a tube or bar of stock, tube-feeding means, a stop opposite said spindle, a movable support upon which said stop is adjustably mounted, a spring for holding said support in normal position, an adjustable stop against which said support is held by said spring, and intermittently operative means for retracting said support and the first-mentioned stop.

24. The combination with a revoluble driver, of means operatively connected thereto for rotating a tube or bar of soft stock, means also operatively connected to said driver for feeding the stock intermittently, and a succession of means also operatively connected to said driver for slicing off the end of the stock.

25. The combination with a revoluble driver, of means connected thereto for rotating a tube or bar of flexible stock, means also connected to said driver for feeding the stock intermittently, and a succession of means also connected to said driver for slicing off the end of the stock between feeding operations.

26. The combination with a revoluble driver, of means connected thereto for rotating a tube or bar of flexible stock, cam-driven means also connected to said driver for feeding stock intermittently, a succession of means also connected to said driver for slicing off the end of the stock, and an adjustable gage for mechanically determining the thickness of the gaskets or disks to be cut from the stock.

27. The combination with a revoluble driver, of means connected thereto for rotating a tube or bar of soft stock, means also connected to said driver for feeding the stock intermittently, a succession of cutters also connected to said driver for slicing off the end of the stock, and an adjustable gage for determining the thickness of the gaskets or disks to be cut, and means also connected to said driver for retracting said gage for each slicing operation.

28. The combination with a revoluble driver, of means operatively connected thereto for rotating a tube or bar of flexible stock, means also connected to said driver for feeding the stock intermittently, a set of slicers also connected to said driver for slicing off the end of the stock, and a revoluble stop for the end of the stock.

29. The combination with a revoluble driver, of means connected thereto for rotating a tube of flexible stock, means also connected to said driver for feeding the stock intermittently, a succession of cutters also connected to said driver for slicing off the end of the stock, a stop for the end of the stock, and means for effecting adjustment of said stop relatively to the slicing means.

30. The combination with a revoluble driver, of means connected thereto for rotating a tube of flexible stock, means also connected to said driver for feeding the stock intermittently, means consisting of a set of slicers also connected to said driver for slicing off the end of the stock, a revoluble stop for the end of the stock, means for effecting adjustment of said stop relatively to the slicing means, intermittently-operative means for retracting said stop, means for pressing said stop toward said spindle, and an adjustable stop for limiting the movement of the first-mentioned stop toward the spindle.

31. The combination with a device formed for gripping a tube or bar of yielding stock, and means for rotating said gripping device, of a slicer, means for effecting a relative slicing movement between said slicer and said stock-gripping means, yielding means for feeding the stock, a stop for the stock, positively-operating means for retracting said stop, and a spring for returning said stop to normal position.

32. The combination with a device formed for gripping a tube of yielding stock and means for rotating said gripping device, of a slicer, means for effecting a relative slicing movement between said slicer and said stock-gripping means, yielding means for feeding the stock, said feeding means being so arranged as to give an excessive advancing movement to the leading end of the stock at each feeding operation, a stop for the stock, positively-operating means for retracting said stop, and a spring for returning said stop to normal position, and for slightly retracting the stock.

33. The combination of a hollow spindle having means at one end for gripping a tube of yielding stock, a slicer opposite said end of the spindle, and a follower for said stock, said follower comprising a rod at the opposite end of said spindle and in line therewith and mounted for movement through the spindle, said follower having a revoluble rest for engaging the stock, and a nipple for insertion within the stock.

34. The combination of a wheel provided around its border with a set of open slots, slicing-knives secured to said wheel by means of bolts seated in said slots, a spindle provided with means for gripping a tube of yielding stock, movement-reducing gearing between said spindle and said wheel, and means for feeding the stock intermittently.

35. The combination with means for rotating and a succession of means for slicing a tube or bar of yielding stock, of means for feeding the stock intermittently, said feeding means including a feeding-rod, means for reciprocating the same endwise, a head mounted for movement longitudinally of said feeding-rod, cam-driven means for enabling said feeding-rod to advance said head step by step, and a follower-rod secured to said head for engaging the tail end of the stock.

36. The combination with means for slicing a tube or bar of yielding stock, of a feed-rod, a spring for advancing said rod, a cam for retracting said rod, a follower adapted to engage the tail end of the stock, and a clutch for enabling said feed-rod at each advance stroke thereof to advance said follower.

37. The combination with means for slicing a tube or bar of yielding stock, of a feed-rod, a spring and a cam for reciprocating said rod, a follower adapted to engage the tail end of the stock, and a roller-clutch for enabling said feed-rod at each advance stroke thereof to advance the follower.

38. The combination with means for slicing a tube or bar of yielding stock, of a feed-rod, a spring for advancing said rod, a cam for retracting said rod, a follower adapted to engage the tail of the stock, a clutch for enabling said feed-rod at each advance stroke thereof to advance the follower, a stop for the leading end of the stock, and means for adjusting said stop to different positions for slicing gaskets or disks of different thicknesses.

39. The combination with means for slicing a tube or bar of yielding stock, of a rail, a head mounted thereon, a friction device between said head and said rail for opposing the movement of said head, a feed-rod extending longitudinally of said rail, a spring for advancing said feed-rod, a cam for retracting said feed-rod, balls or rollers in said head, one upon each side of said feed-rod, recesses in said head for said rollers, said recesses having converging walls, springs pressing said rollers toward the narrow ends of said recesses, and a follower-rod connected to said head.

40. The combination with means for slicing a tube or bar of yielding stock, of a rail, a head mounted thereon, a device between said head and said rail for opposing the movement of said head, a feed-rod extending along said rail, a spring for advancing said feed-rod, a cam for retracting said feed-rod, balls or rollers in said head, one upon each side of said feed-rod, converging recesses in said head for said rollers, springs pressing said rollers toward the narrow ends of said recesses, a lever mounted upon said head and having means for pressing said rollers in the opposite direction, and a follower-rod connected to said head.

41. The combination with a spindle provided with means for gripping a tube or bar of yielding stock, of a wheel, a succession of slicers mounted upon said wheel, a succession of cams rotating with said wheel, a feeding-rod intermittently retracted by said cams, a spring for advancing said feeding-rod, a rail parallel with said feeding-rod, a head upon said rail, a friction-clutch between said feeding-rod and said head for enabling the rod to advance the head, and a follower-rod connected to said head for engaging the tail end of the stock.

42. The combination with a spindle provided with means for gripping a tube or bar of yielding stock, of a wheel mounted in proximity to one end of said spindle, a succession of slicers mounted upon said wheel, movement-reducing gearing between said spindle and said wheel, a stop for the leading end of the stock, a movable support whereon said stop is mounted, a succession of cams upon said wheel for engaging said support to retract said stop, a spring for returning said stop to normal position, a wheel rigid with said slicer-wheel and provided with a succession of cams, a feeding-rod mounted in position to be retracted by the last-mentioned cams, a spring for advancing said feeding-rod, a stock-follower rod adapted to enter the spindle, and a clutch between said feeding-rod and said follower-rod.

43. The combination with a spindle provided with means for gripping a tube or bar of yielding stock, of a wheel mounted in proximity to one end of said spindle, a plurality of slicers mounted upon said wheel, movement-reducing gearing between said spindle and wheel, means for stopping the leading end of the stock, a movable support whereon said stopping means is mounted, a plurality of cams upon said wheel for engaging said support to retract said stopping means; a resilient means for returning said stopping means to normal position, a wheel rigid with said slicer-wheel and provided with a plurality of cams, a feeding-rod mounted in position to be retracted by the last-mentioned cams, a spring for advancing said feeding-rod, a rail having a groove in which said feeding-rod lies, a head mounted upon said rail, a roller-clutch between said feeding-rod and said head, and a stock-follower rod connected to said head and adapted to enter the other end of said spindle.

44. The combination of a spindle provided with means for gripping a tube or bar of yielding stock, rotating means for the spindle, feeding means for the stock, a slicer, and a stop for said stock; said stop consisting of a disk, a set of balls upon the rear side of said disk, a revoluble spacer for said balls, and a pivotal support for said stop and spacer.

45. The combination of a spindle provided with means for gripping a tube or bar of yielding stock, rotating means for the spindle, feeding means for the stock, a slicer, and a stop for said tube; said stop consisting of a disk, a set of balls upon the rear side of said disk, a revoluble spacer for said balls, and a pivotal support for said stop and spacer; said balls being disposed in a plurality of arcs eccentric to one another and eccentric to the axis of rotation of the stop.

46. The combination with a spindle provided with means for gripping a tube or bar of yielding stock, rotating means for the spindle, feeding means for the stock, a slicer, and a stop for said stock; said stop consisting of a disk, a set of balls upon which the rear side of said disk bears, a revoluble spacer for said balls, and a support for said disk, balls and spacer; said balls being disposed in a plurality of arcs eccentric to one another and eccentric to the axis of rotation of the disk, and a shoulder screw-threaded into said support and serving as a pivot for said disk and said spacer.

47. The combination with a slicer and means for operating the same, of a hollow spindle connected to said slicer, a detachable device upon said spindle for gripping a tube or bar of yielding stock, a detachable lining within said spindle, and stock-feeding means.

FRANK E. HARTHAN.

Witnesses:
  J. W. GASKILL,
  F. M. STAPLES.